F. MERIAN.
ENDLESS CHAIN CONVEYER.
APPLICATION FILED APR. 28, 1909.
943,121.
Patented Dec. 14, 1909.
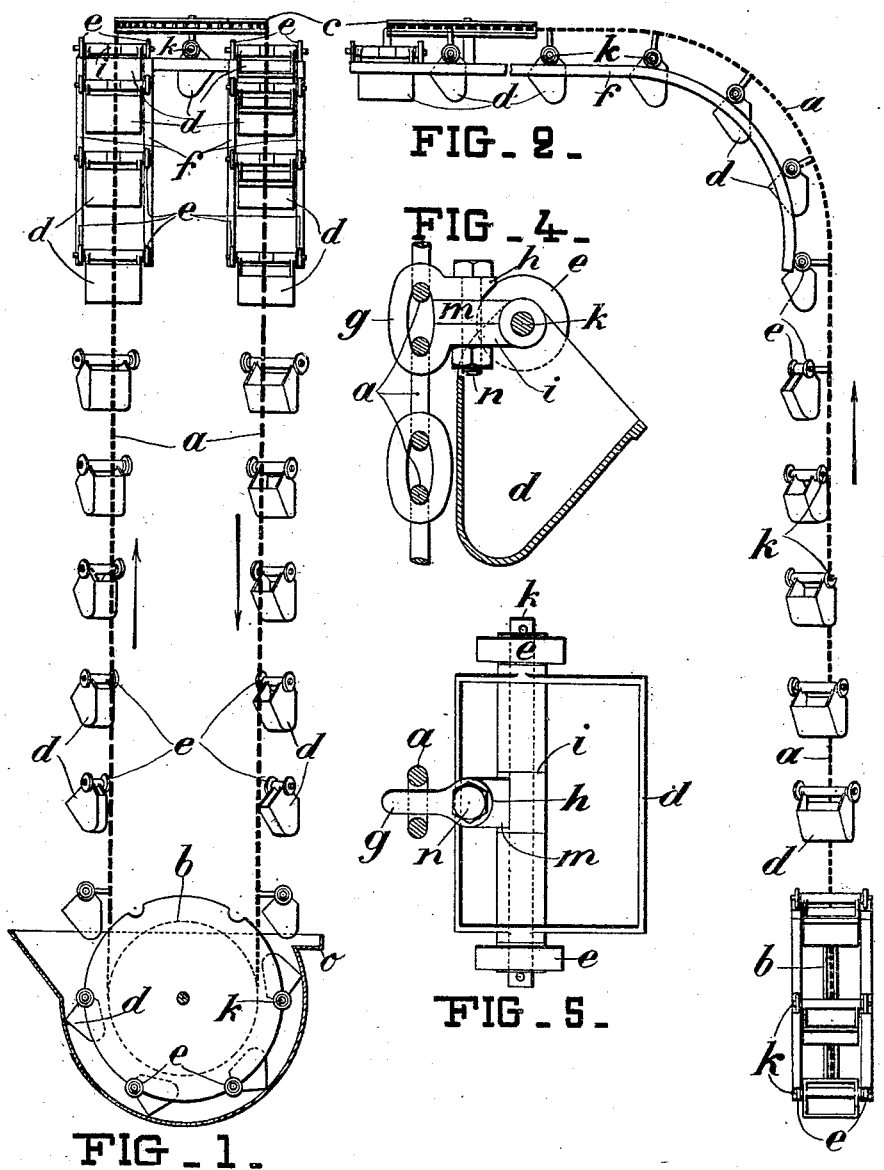
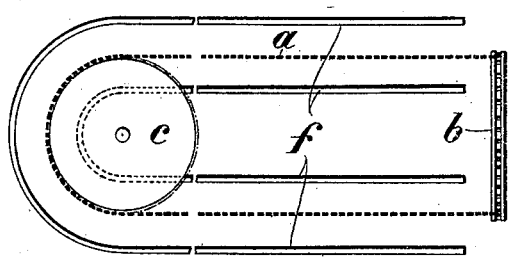

UNITED STATES PATENT OFFICE.

FRITZ MERIAN, OF BASEL, SWITZERLAND.

ENDLESS-CHAIN CONVEYER.

943,121.  Specification of Letters Patent.  Patented Dec. 14, 1909.

Application filed April 28, 1909. Serial No. 492,805.

*To all whom it may concern:*

Be it known that I, FRITZ MERIAN, a citizen of the Swiss Republic, residing at Basel, Switzerland, have invented a new and useful Endless-Chain Conveyer, of which the following is a clear, full, and exact specification.

This invention relates to an endless conveying system, the main parts being a single endless link chain and attached elevator-buckets, which allow the transport of the material in any plane and in any direction, vertically, horizontally or on a slope, to the dumping place, where the buckets are emptied by being tilted, and from which place they return, to the place, where they are filled. The difference between this system and other conveyers of a similar construction is that the buckets, which automatically fill themselves, are suspended from one endless link chain (such as a coil chain or a crane chain) only, and are able to oscillate, and that this chain is twisted, in the vertical or nearly vertical parts of the chain-way, by means of the chain-guides (rails or chain-wheels), at the ends of these parts, over which guides the chain is laid, with an initial twist between them. The buckets, in passing through these parts, therefore, describe helical lines. The chain is sufficiently twisted (which can be done with a link chain) that the buckets, having passed vertical or nearly vertical parts of the chain-way, and notwithstanding their position to the chain when entering these parts, will hang underneath the chain while passing a horizontal or inclined part of the chain-way. By using one link chain only, which can be turned off (deviated) in the direction of its four sides, the conveyer can be led in any direction. It can go up and down, can turn to the right and to the left, and yet at every place the buckets will be perpendicularly suspended from the chain, excepting only where they are filled or emptied. By the use of an ordinary link chain, this conveying system, which needs no special filling apparatus, as the buckets fill themselves by simply being drawn through the material, is very simple and will cost but little, compared with other more complicated systems. It will, therefore, be especially useful for the conveying of relatively small quantities, and in other cases where large and complicated installations are too expensive.

Figures 1, 2 and 3 of the drawing are respectively a front view, a side view and a top view of a simple form of the new kind of conveying system. From the place, where the buckets are filled, the chain goes up vertically, then turns into a horizontal plane, in which it returns in order to go down to the filling place again. Figs. 4 and 5 show a simple means for attachment of the buckets to links of the chain.

The conveyer represented by Figs. 1 to 3 has an endless link chain $a$, which is laid at the bottom on a chain-wheel $b$ with a horizontal axis and at the top on a chain-wheel $c$ with a vertical axis. The buckets $d$ are suspended from this chain.

It will be noticed that, in the embodiment shown in the drawings (see especially Fig. 3), the path of rotation of the wheel $b$ is at a right angle with relation to the direction of the rails $f$ where the wheels $e$ first engage with the chain and the latter is twisted or turned 90° while passing from the wheel $b$ to the rails, or from the latter to said wheel, and the buckets, therefore, describe helical lines, in these parts of the chain-way, when the chain is traveling.

While being filled the buckets $d$ are supported at their back by the chain $a$ or the chain-wheel $b$ or both. In the horizontal parts of the chain-way the buckets are hanging underneath the chain and are able to oscillate, the axis of oscillation and the axis of the chain lying crosswise. They are tilted and thus emptied by striking against an obstacle (bar, nose, roller, etc.), placed in their way (not shown on the drawing).

The chain $a$ is supported in the horizontal parts of the chain-way by means of the rollers $e$ which are attached to it on both sides and which, at the time the chain is moving horizontally, travel on rails $f$. These rails also serve to support and guide the chain when turning from the upward direction into the horizontal direction and from the horizontal direction into the downward direction. Instead of the rails, any other guide-means could of course be used at these places. The chain-wheel $b$ can have recesses for the rollers $e$ in order to keep the buckets steadier on the wheel, while they are filling.

An attachment for the buckets $d$ to the chain $a$ is shown in Figs. 4 and 5. At certain distances, according to the number of buckets, special links $g$ are inserted into the chain $a$. These links are open on one side, the ends forming two lateral projections $h$ and $i$. The projection $i$ serves as bearing for the pin $k$ of the bucket. After the link is connected with its two neighboring links the opening between the two projections $h$ and $i$ is closed by means of the filler $m$ and the screw $n$.

The bucket $d$ is suspended from the pin $k$ and on this pin $k$ there are also the rollers $e$. It will be seen, that this special chain-link is constructed in such a way that three of its sides are not obstructed and are similar to the sides of an ordinary link. The chain can therefore be turned off in any of these directions by simply laying it over an ordinary chain-wheel, an arrangement which demands but very little space. The special chain-link can of course also be made in any other desired way.

The buckets can be brought into their proper position for being filled by a nose $o$, or other means.

What I claim is:—

1. A conveyer, comprising an endless link chain, buckets secured at intervals to one side of said chain, means for leading said chain in horizontal parts of the chain-way, means for leading said chain at both ends of substantially vertical parts of the chain-way and for exerting a twist upon the chain in said substantially vertical parts, and pin-connections between the chain and the buckets which allow the buckets to hang freely underneath the chain when passing through said horizontal parts of the chain-way, and to lie against the chain while being in filling position.

2. A conveyer, comprising an endless link chain, buckets secured at intervals to one side of said chain, means for leading said chain in inclined parts of the chain-way, means for leading said chain at both ends of substantially vertical parts of the chain-way and for exerting a twist upon the chain in said substantially vertical parts, and pin-connections between the chain and the buckets which allow the buckets to hang freely underneath the chain when passing through said inclined parts of the chain-way, and to lie against the chain while being in filling position.

3. A conveyer, comprising an endless link chain, buckets secured at intervals of said chain, means for leading said chain at both ends of substantially vertical parts of the chain-way and for exerting a twist upon the chain in said parts of the chain-way, special links inserted in said chain, having each on one side only, a projection with a pin for the oscillatory suspension of said buckets, the three other sides of said special links being free, thus allowing the chain to run over chain-wheels in the direction of any one of these three sides.

In witness whereof I have hereunto signed my name this 17th day of April 1909, in the presence of two subscribing witnesses.

FRITZ MERIAN.

Witnesses:
  GEO. GIFFORD,
  AMAND RITTER.